(12) United States Patent
Kobayashi et al.

(10) Patent No.: US 9,443,659 B2
(45) Date of Patent: Sep. 13, 2016

(54) SOLID ELECTROLYTIC CAPACITOR AND METHOD FOR MANUFACTURING SAME

(71) Applicant: SANYO ELECTRIC CO., LTD., Osaka (JP)

(72) Inventors: Yasumi Kobayashi, Kyoto (JP); Kazuhiro Takatani, Hyogo (JP); Masaaki Nemoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 104 days.

(21) Appl. No.: 14/340,283

(22) Filed: Jul. 24, 2014

(65) Prior Publication Data

US 2014/0334070 A1    Nov. 13, 2014

Related U.S. Application Data

(63) Continuation of application No. PCT/JP2012/083069, filed on Dec. 20, 2012.

(30) Foreign Application Priority Data

Jan. 31, 2012    (JP) .................................. 2012-018231

(51) Int. Cl.
*H01G 9/15* (2006.01)
*H01G 9/042* (2006.01)
(Continued)

(52) U.S. Cl.
CPC ............ *H01G 9/042* (2013.01); *H01G 9/0032* (2013.01); *H01G 9/07* (2013.01); *H01G 9/15* (2013.01); *Y10T 29/417* (2015.01)

(58) Field of Classification Search
CPC ............ H01G 9/15; H01G 9/07; H01G 9/04; H01G 9/048
See application file for complete search history.

(56) References Cited

U.S. PATENT DOCUMENTS 5,643,432 A * 7/1997 Qiu ...................... H01G 9/0032
                                                    205/122
2003/0007318 A1    1/2003 Kojima et al.
(Continued)

FOREIGN PATENT DOCUMENTS

CN    1389883       1/2003
JP    64-012517 A   1/1989
(Continued)

OTHER PUBLICATIONS

International Search Report issued in PCT/JP2012/083069, dated Mar. 26, 2013, with English translation.
(Continued)

*Primary Examiner* — Dion R Ferguson
(74) *Attorney, Agent, or Firm* — McDermott Will & Emery LLP (57) ABSTRACT

A solid electrolytic capacitor including a positive electrode including a sintered body of metal particles of tantalum or an alloy of tantalum, a dielectric layer formed on a surface of the positive electrode; and an electrolyte layer formed on the dielectric layer. A CV value (a value of product of capacitance and voltage) of the metal particles is 100000 μF·V/g or more. The positive electrode includes a surface region and an interior region, the surface region is configured by an outer surface of the positive electrode and a vicinity of the outer surface, and the interior region is an inner part of the positive electrode surrounded by the surface region. An average film thickness of the dielectric layer in the surface region is thicker than an average film thickness of the dielectric layer in the interior region.

4 Claims, 11 Drawing Sheets

(51) Int. Cl.
*H01G 9/07* (2006.01)
*H01G 9/00* (2006.01)

(56) References Cited

U.S. PATENT DOCUMENTS

| | | | |
|---|---|---|---|
| 2008/0174939 A1 | 7/2008 | Kobayashi et al. | |
| 2009/0086413 A1* | 4/2009 | Takatani | H01G 9/025 361/523 |
| 2011/0317335 A1* | 12/2011 | Pinwill | H01G 9/0036 361/525 |
| 2013/0050904 A1* | 2/2013 | Nemoto | H01G 9/04 361/528 |
| 2014/0268501 A1* | 9/2014 | Biler | H01G 9/0029 361/524 |
| 2015/0364263 A1* | 12/2015 | Petrzilek | H01G 9/15 361/525 |

FOREIGN PATENT DOCUMENTS

| | | |
|---|---|---|
| JP | 02-277213 A | 11/1990 |
| JP | 10-335187 A | 12/1998 |
| JP | 2003-338432 A | 11/2003 |
| JP | 2005-340714 A | 12/2005 |
| JP | 2006-041228 A | 2/2006 |
| JP | 2008-198984 A | 8/2008 |

OTHER PUBLICATIONS

English Translation of Chinese Search Report dated Mar. 28, 2016 for the related Chinese Patent Application No. 201280068470.0.

* cited by examiner

SOLID ELECTROLYTIC CAPACITOR AND METHOD FOR MANUFACTURING SAME

CROSS REFERENCE TO RELATED APPLICATIONS

This application is a continuation of International Application No. PCT/JP2012/083069, filed on Dec. 20, 2012, which in turn claims priority from Japanese Patent Application No. 2012-018231, filed on Jan. 31, 2012, the contents of all of which are incorporated herein by reference in their entirety.

BACKGROUND

A solid electrolytic capacitor includes a capacitor element comprising a positive electrode made of valve metal, a positive electrode lead having a first end portion embedded in the positive electrode and a second end portion protruding from the positive electrode, a dielectric layer formed by anodizing the positive electrode and a part of the positive electrode lead, an electrolyte layer formed on the dielectric layer, and a negative electrode extracting layer formed on the electrolyte layer.

The first end portion of the positive electrode lead is embedded in a molded product made of powder of the valve metal with the second end portion protruding therefrom, and the molded product is sintered, so that the positive electrode and the positive electrode lead are integrally formed with each other.

In a solid electrolytic capacitor in which a positive electrode lead is embedded in a positive electrode, in a process of producing the solid electrolytic capacitor, stress is applied to a root portion of the positive electrode lead, and leakage current is increased in this portion.

Japanese Patent Application Unexamined Publication No. 2003-338432 proposes that leakage current be reduced by making a film thickness of a dielectric layer in the vicinity of a root portion of a positive electrode lead larger than a film thickness of the dielectric layer in the other portion.

SUMMARY

According to the disclosure of Japanese Patent Application Unexamined Publication No. 2003-338432, when a film thickness of a dielectric layer in the vicinity of a root portion of a positive electrode lead is made to be larger, leakage current can be reduced, but capacitance is lowered.

Therefore, solid electrolytic capacitors reduced leakage current without lowering capacitance have been demanded.

The present inventors have found that when a positive electrode configured by a sintered body of metal particles of tantalum or an alloy thereof having a CV value (a value of product of capacitance and voltage) of 100000 μF·V/g or more is used, and when an average film thickness of a dielectric layer in a surface region, which is an outer surface of the positive electrode and its vicinity, is made to be smaller than an average film thickness of the dielectric layer in the interior region, which is an inner part of the positive electrode surrounded by the surface region, leakage current can be reduced and capacitance can be enhanced.

That is to say, a solid electrolytic capacitor of this disclosure is a solid electrolytic capacitor comprising a positive electrode configured by a sintered body of metal particles of tantalum or an alloy of tantalum, a dielectric layer formed on a surface of the positive electrode, and an electrolyte layer formed on the dielectric layer. A CV value of the metal particles is 100000 μF·V/g or more. The positive electrode includes a surface region and an interior region, the surface region is configured by an outer surface of the positive electrode and a vicinity of the outer surface, and the interior region is an inner part of the positive electrode surrounded by the surface region. An average film thickness of the dielectric layer in the surface region is larger than an average film thickness of the dielectric layer in the interior region.

In a preferable exemplary embodiment in accordance with the present disclosure, the outer surface of the positive electrode comprising a first surface and a second surface, the second surface is located opposite to the first surface. The solid electrolytic capacitor further comprises a positive electrode lead having a first end portion embedded in the first surface of the positive electrode, and a second end portion protruding from the first surface.

In a first aspect in accordance with the present disclosure, the surface region includes a first region in a vicinity of a root of the positive electrode lead. An average film thickness of the dielectric layer in the first region is larger than an average film thickness of the dielectric layer in the interior region.

In a second aspect in accordance with the present disclosure, the surface region includes a second region including the second surface and a vicinity of the second surface. An average film thickness of the dielectric layer in the second region is larger than an average film thickness of the dielectric layer in the interior region.

A producing method in accordance with this disclosure is a method for producing a solid electrolytic capacitor comprising a positive electrode configured by a sintered body of metal particles of tantalum or an alloy of tantalum, a dielectric layer formed on a surface of the positive electrode, and an electrolyte layer formed on the dielectric layer. The positive electrode includes a surface region and an interior region, the surface region is configured by an outer surface of the positive electrode and a vicinity of the outer surface, and the interior region is an inner part of the positive electrode surrounded by the surface region. The method comprises forming the dielectric layer on a surface of the positive electrode by anodizing at least a part of the surface region so as to make an average film thickness of the dielectric layer in the surface region larger than an average film thickness of the dielectric layer in the interior region.

DESCRIPTION OF EMBODIMENTS

The exemplary embodiment of the present disclosure is described with reference to drawings. In the description of the following drawings, the same or similar reference numerals are given to the same or similar portions.

The drawings are schematically shown and rates of dimensions are different from those of the actual one. Therefore, specific dimensions and the like should be determined with reference to the following description. And there are portions having different relation or rates of the dimensions among the drawings.

Exemplary Embodiment

Figure 1:
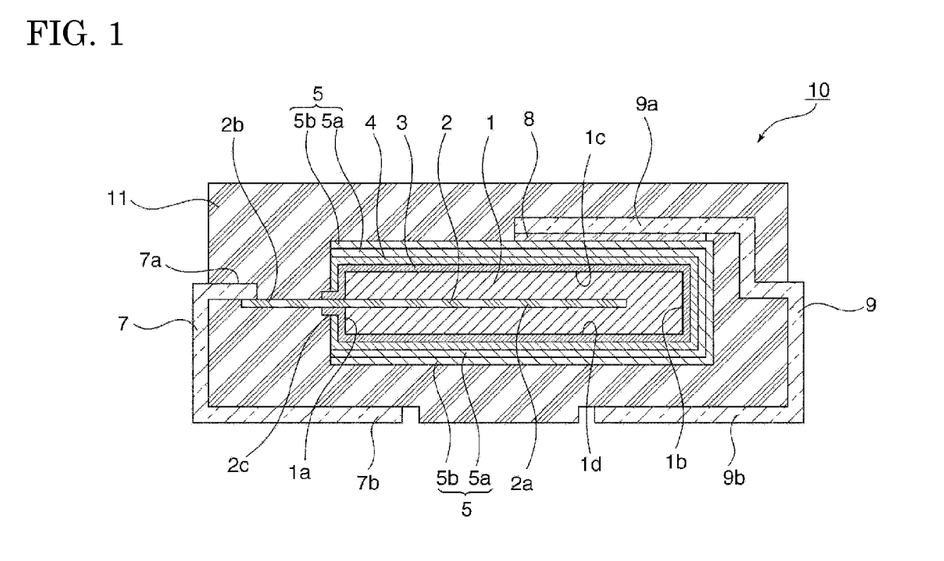
FIG. 1 is a sectional view showing a solid electrolytic capacitor in accordance with an exemplary embodiment.

FIG. 1 is a sectional view for illustrating the inside of solid electrolytic capacitor 10 in accordance with this exemplary embodiment.

As shown in FIG. 1, solid electrolytic capacitor 10 in accordance with this exemplary embodiment includes a capacitor element including positive electrode 1 into which positive electrode lead 2 is embedded, dielectric layer 3 formed on positive electrode 1, electrolyte layer 4 formed on dielectric layer 3, and negative electrode extracting layer 5 formed on electrolyte layer 4.

First end portion 7a of positive electrode terminal 7 is coupled to second end portion 2b of positive electrode lead 2, and first end portion 9a of negative electrode terminal 9 is attached to negative electrode extracting layer 5 with conductive adhesive 8. Then, resin outer package 11 is formed on the periphery of the capacitor element such that second end portion 7b of positive electrode terminal 7 and second end portion 9b of negative electrode terminal 9 are exposed.

Note here that FIG. 1 schematically shows only dielectric layer 3 formed at an outer periphery side of positive electrode 1 configured by porous sintered body. Thicknesses of regions of positive electrode 1 and dielectric layer 3 in accordance with this exemplary embodiment are described later.

Solid electrolytic capacitor 10 in accordance with this exemplary embodiment is described.

For positive electrode 1, a porous sintered body made of valve metal or an alloy including valve metal as a main component is used. Positive electrode 1 is formed by molding metal particles of tantalum or an alloy including tantalum as a main component, and sintering the molded product. Preferable examples of the alloy including valve metal as a main component include an alloy including 10% or less of additives with respect to the total weight of the alloy. Examples of the additives contained in the alloy of tantalum are silicon, vanadium, boron, nitrogen, and the like, and the alloy is formed by adding such additives to tantalum.

As material of positive electrode lead 2, valve metal or an alloy including valve metal as a main component can be used. Furthermore, the material of positive electrode lead 2 may be the same valve metal as or different valve metal from that of positive electrode 1.

As shown in FIG. 1, positive electrode 1 has first surface 1a, second surface 1b, and side surfaces 1c and 1d which form the outer periphery of the porous sintered body. An outer surface of positive electrode 1 denotes a surface surrounding positive electrode 1, which includes first surface 1a, second surface 1b, and side surfaces 1c and 1d.

First end portion 2a of positive electrode lead 2 is embedded in first surface 1a of positive electrode 1, second end portion 2b of positive electrode lead 2 protrudes from first surface 1a of positive electrode 1. Second surface 1b is a part of an outer surface of positive electrode 1 opposite to first surface 1a. Root 2c of positive electrode lead 2 is a portion in which positive electrode lead 2 protrudes from positive electrode 1.

Figure 2:
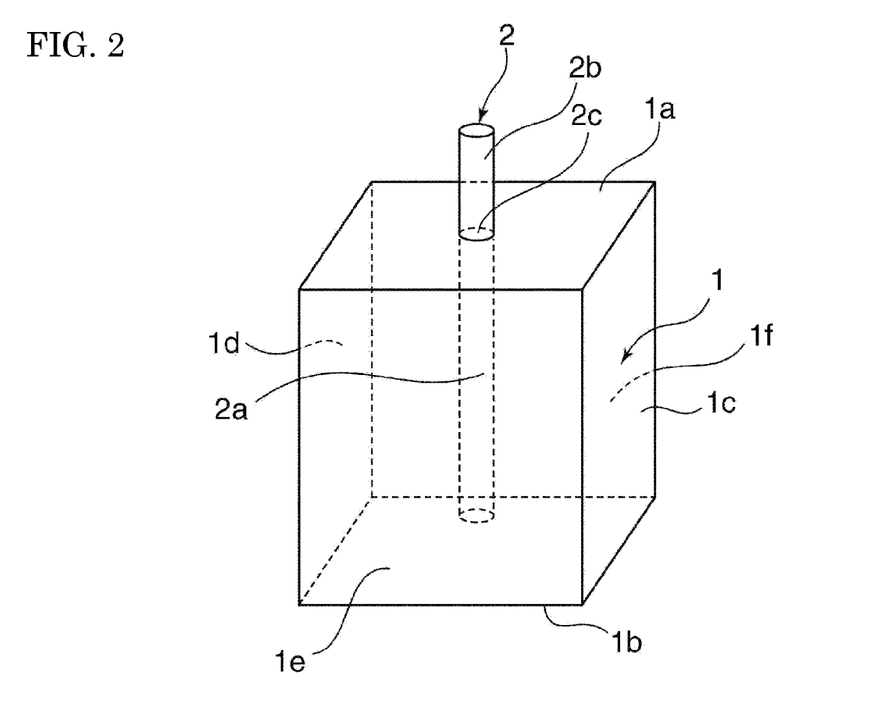
FIG. 2 is a perspective view showing a shape of a positive electrode shown in FIG. 1.

FIG. 2 is a perspective view showing a shape of positive electrode 1 into which positive electrode lead 2 is embedded. Positive electrode 1 has a substantially rectangular parallelepiped shape including first surface 1a, second surface 1b, and side surfaces 1c, 1d, 1e and 1f located between first surface 1a and second surface 1b.

Figure 3:
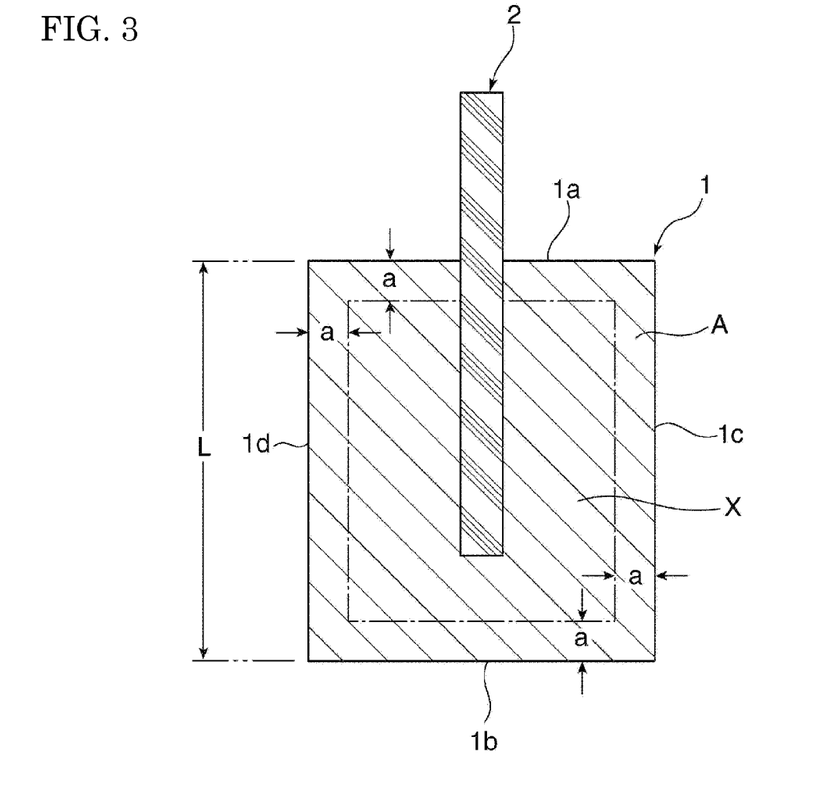
FIG. 3 is a sectional view for illustrating a region of the positive electrode shown in FIG. 2.
Figure 4:
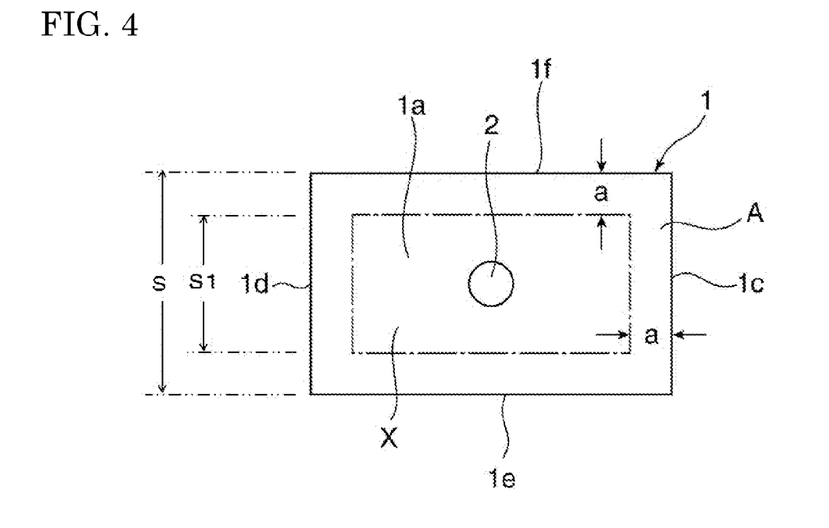
FIG. 4 is a top view of the positive electrode shown in FIG. 3.

FIG. 3 is a sectional view showing positive electrode 1 in which positive electrode lead 2 is embedded. FIG. 4 is a top plan view showing positive electrode 1 of FIG. 3.

As shown in FIGS. 3 and 4, in positive electrode 1 having a substantially rectangular parallelepiped shape, the direction of the longest side is defined as a longitudinal direction and when the length in this longitudinal direction is L, a distance of 10% of L is showed as "a." The direction of the shortest side is defined as a shorter direction and when the length in this shorter direction is S, and when length S1 of an interior region (detail is described later) in the shorter direction is 50% or less of S, a distance of 25% of S is defined as "a."

In this exemplary embodiment, surface region A denotes a region from outer surfaces 1a to 1f of positive electrode 1 to the depth of distance a. Furthermore, interior region X denotes an inner part of positive electrode 1 surrounded by surface region A.

In the present disclosure, an average film thickness of dielectric layer 3 in surface region A is set to be larger than an average film thickness of dielectric layer 3 in interior region X. Since the average film thickness of dielectric layer 3 in surface region A only needs to be larger than average film thickness of dielectric layer 3 in interior region X, the film thickness of dielectric layer 3 in a whole part of surface region A does not need to be larger than the average film thickness of dielectric layer 3 in interior region X. The average film thickness of dielectric layer 3 in surface region A can be larger than the average film thickness of dielectric layer 3 in interior region X, because film thickness of dielectric layer 3 in a part of surface region A is larger than the average film thickness of dielectric layer 3 in interior region X.

For example, when a portion in surface region A, which is thicker than the average film thickness of dielectric layer 3 in interior region X, is defined as a local portion, in the present disclosure, the average film thickness of dielectric layer 3 in the local portion may be set larger than the average film thickness of dielectric layer 3 in interior region X. The local portion only needs to be formed in at least a part in surface region A. Furthermore, the local portion may be formed in a plurality of positions in surface region A.

Surface region A is more likely to be subjected to stress than interior region X in the process for producing a solid electrolytic capacitor. Therefore, when the average film thickness of dielectric layer 3 in surface region A, which is more likely to be subjected to stress, is made to be thicker, leakage current can be reduced, and capacitance can be enhanced. Furthermore, when the average film thickness of dielectric layer 3 in the local portion only needs to be set to be larger than the average film thickness of interior region X, the leakage current can be reduced and capacitance can be enhanced.

First Aspect of Exemplary Embodiment

Figure 5:
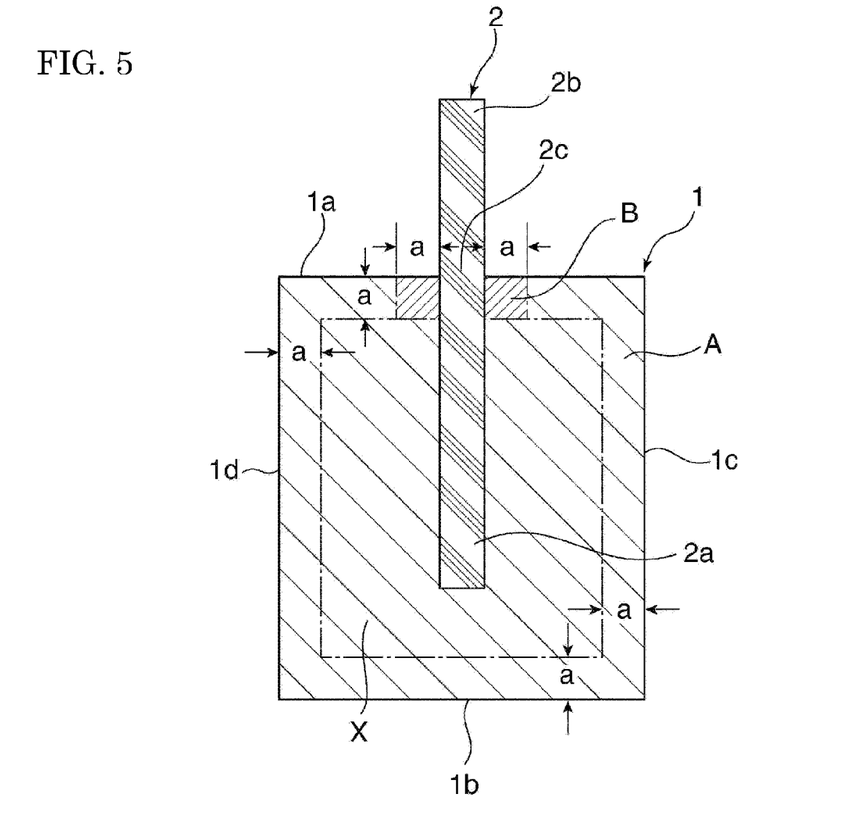
FIG. 5 is a sectional view for illustrating a region of a positive electrode in accordance with a first aspect of the exemplary embodiment.
Figure 6:
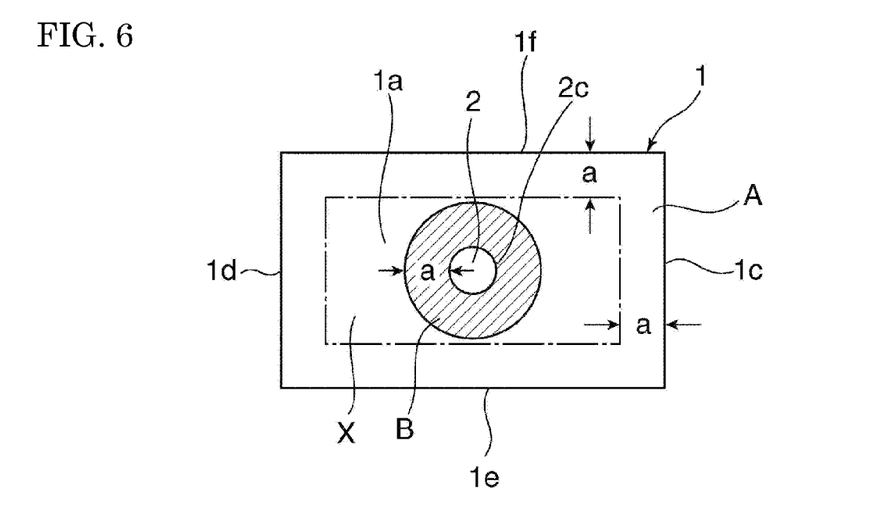
FIG. 6 is a top view of the positive electrode in the first aspect of the exemplary embodiment shown in FIG. 5.

FIG. 5 is a sectional view showing positive electrode 1 in accordance with a first aspect of the present disclosure. FIG. 6 is a top plan view of positive electrode 1 of FIG. 5.

As shown in FIG. 5, first region B is included in surface region A. First region B is a region in the vicinity of root 2c of positive electrode lead 2 in first surface 1a of positive electrode 1. In the first aspect of the exemplary embodiment, the local portion is first region B.

As shown in FIGS. 5 and 6, in this exemplary embodiment, first region B is a region from root 2c of positive electrode lead 2 to a position that is apart from root 2c of positive electrode lead 2 by distance a. And first region B has a depth of distance a in the depth direction of positive electrode 1.

In the first aspect of the present disclosure, an average film thickness of dielectric layer 3 in first region B is set to be larger than an average film thickness of dielectric layer 3 in interior region X. The film thickness of dielectric layer 3 only needs to be larger in at least a part of first region B, the film thickness of dielectric layer 3 in a whole part of first region B does not need to be larger than the average film thickness of dielectric layer 3 in interior region X.

Figure 7:
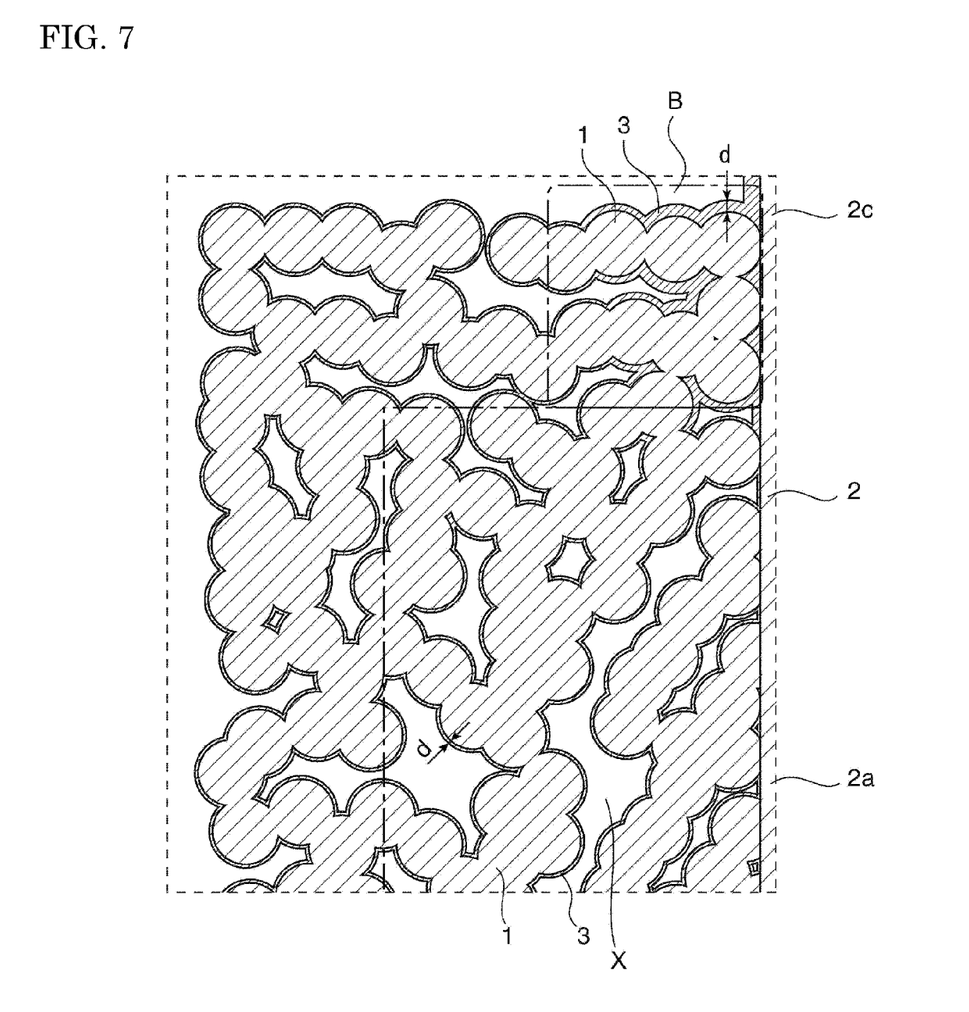
FIG. 7 is an enlarged sectional view showing the region of the positive electrode in the first aspect of the exemplary embodiment.

FIG. 7 is enlarged sectional view showing a portion of positive electrode 1 in first region B. As shown in FIG. 7, in first region B, film thickness d of dielectric layer 3 is larger than the average film thickness d of dielectric layer 3 in interior region X, but film thickness d of dielectric layer 3 in the whole part of first region B is not necessarily larger than the average film thickness d of dielectric layer 3 in interior region X.

The vicinity of root 2c of positive electrode lead 2 is a region that is likely to be subjected to stress in a process for producing the solid electrolytic capacitor. Therefore, by setting the average film thickness of dielectric layer 3 in first region B to be larger than the average film thickness of dielectric layer 3 in interior region X, leakage current can be reduced, and capacitance can be enhanced.

(Second Aspect of Exemplary Embodiment)

Figure 8:
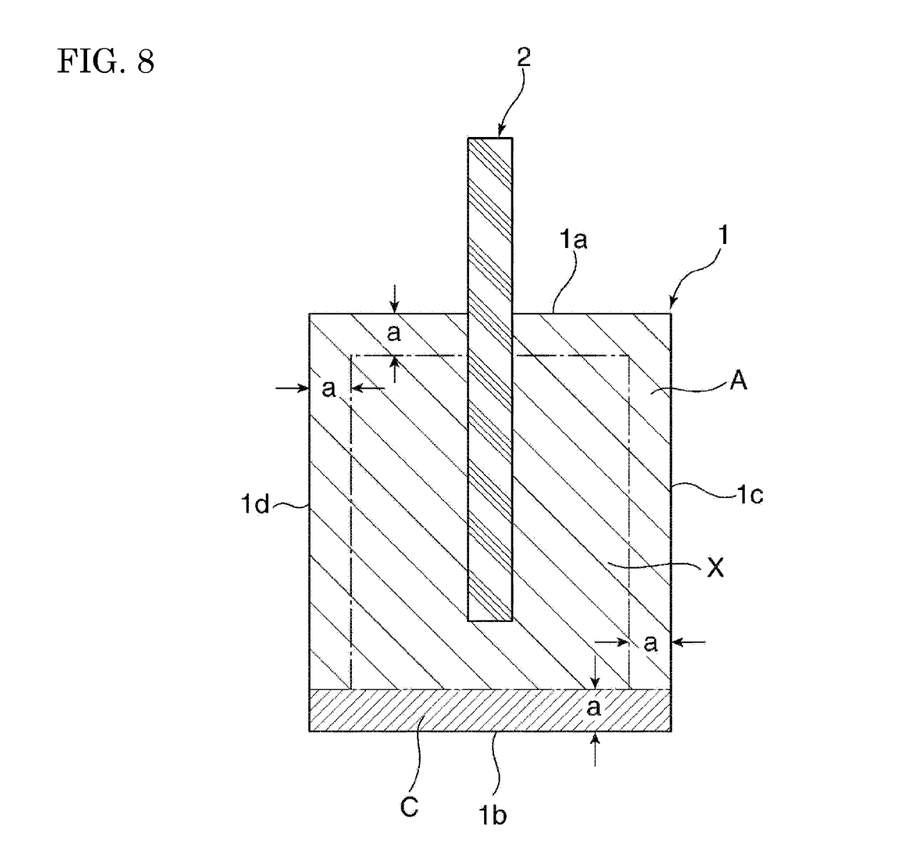
FIG. 8 is a sectional view for illustrating a region of a positive electrode in accordance with a second aspect of the exemplary embodiment.
Figure 9:
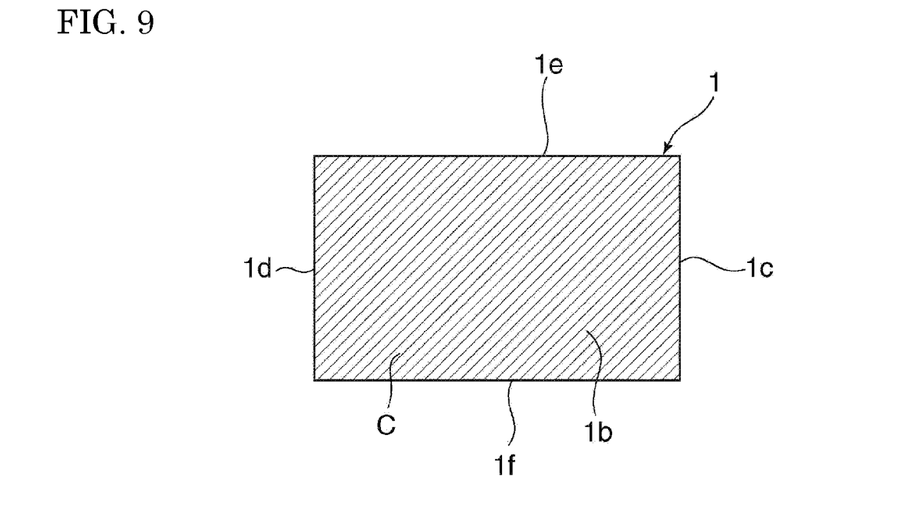
FIG. 9 is a bottom view of the positive electrode in accordance with the second aspect of the exemplary embodiment shown in FIG. 8.

FIG. 8 is a sectional view showing positive electrode 1 in accordance with a second aspect of an exemplary embodiment. FIG. 9 is a bottom plan view of positive electrode 1 of FIG. 8.

As shown in FIG. 8, in the second aspect of the present disclosure, second region C is second surface 1b of positive electrode 1 and the vicinity of second surface 1b, and second region C is included in surface region A. As shown in FIG. 8, in this exemplary embodiment, second region C is a region from second surface 1b to a position that is apart from second surface 1b by distance a in the depth direction of positive electrode 1. The local portion is second region C in accordance with the second aspect of the exemplary embodiment.

In the second aspect of the present disclosure, the average film thickness of dielectric layer 3 in second region C is set to be larger than the average film thickness of dielectric layer 3 in interior region X. Second region C is more likely to be subjected to stress in the process for producing a solid electrolytic capacitor. Therefore, when the film thickness of dielectric layer 3 in surface region C is made to be larger, leakage current can be reduced, and capacitance can be enhanced.

Figure 10:
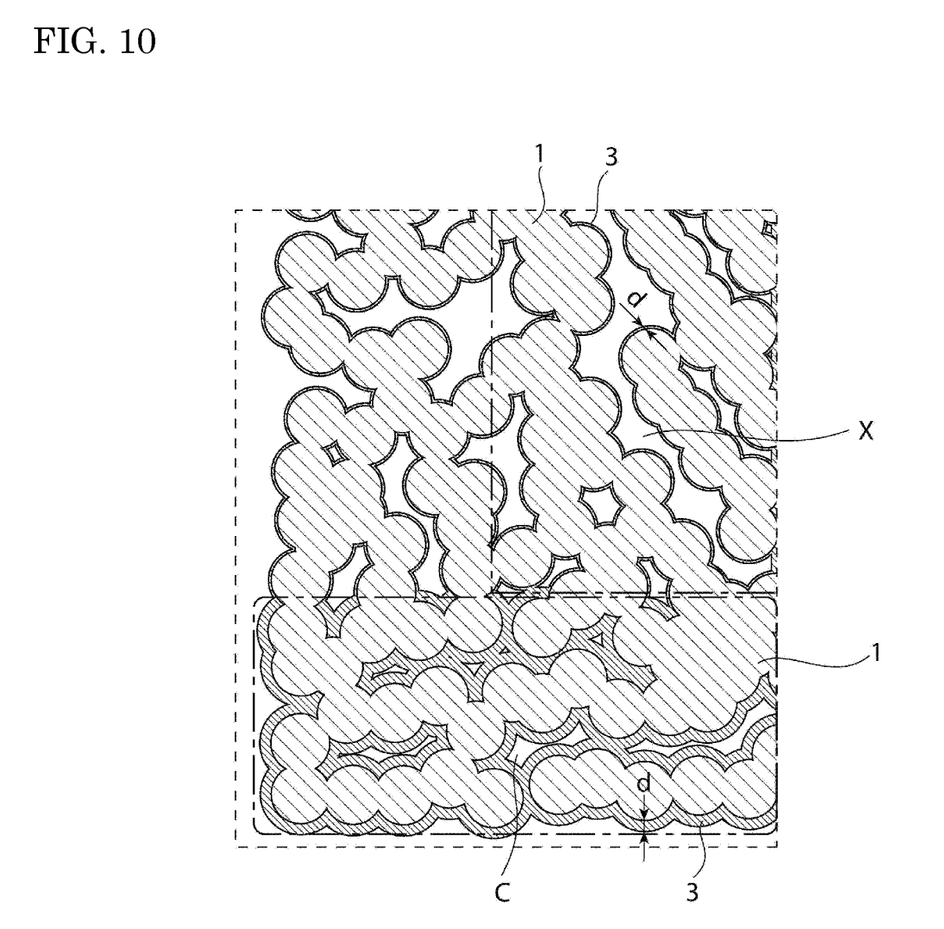
FIG. 10 is an enlarged sectional view showing a region of the positive electrode in accordance with the second aspect of the exemplary embodiment.

FIG. 10 is an enlarged sectional view showing second region C of positive electrode 1.

As shown in FIG. 10, by setting film thickness d of dielectric layer 3 in at least a part of second region C to be larger than average film thickness d of dielectric layer 3 in interior region X, the average film thickness of dielectric layer 3 in second region C only needs to be larger than the average film thickness of dielectric layer 3 in interior region X. Therefore, the film thickness of dielectric layer 3 in a whole part of second region C does not need to be larger than the average film thickness of dielectric layer 3 in interior region X.

First and Second Aspects of Exemplary Embodiment

Figure 11:
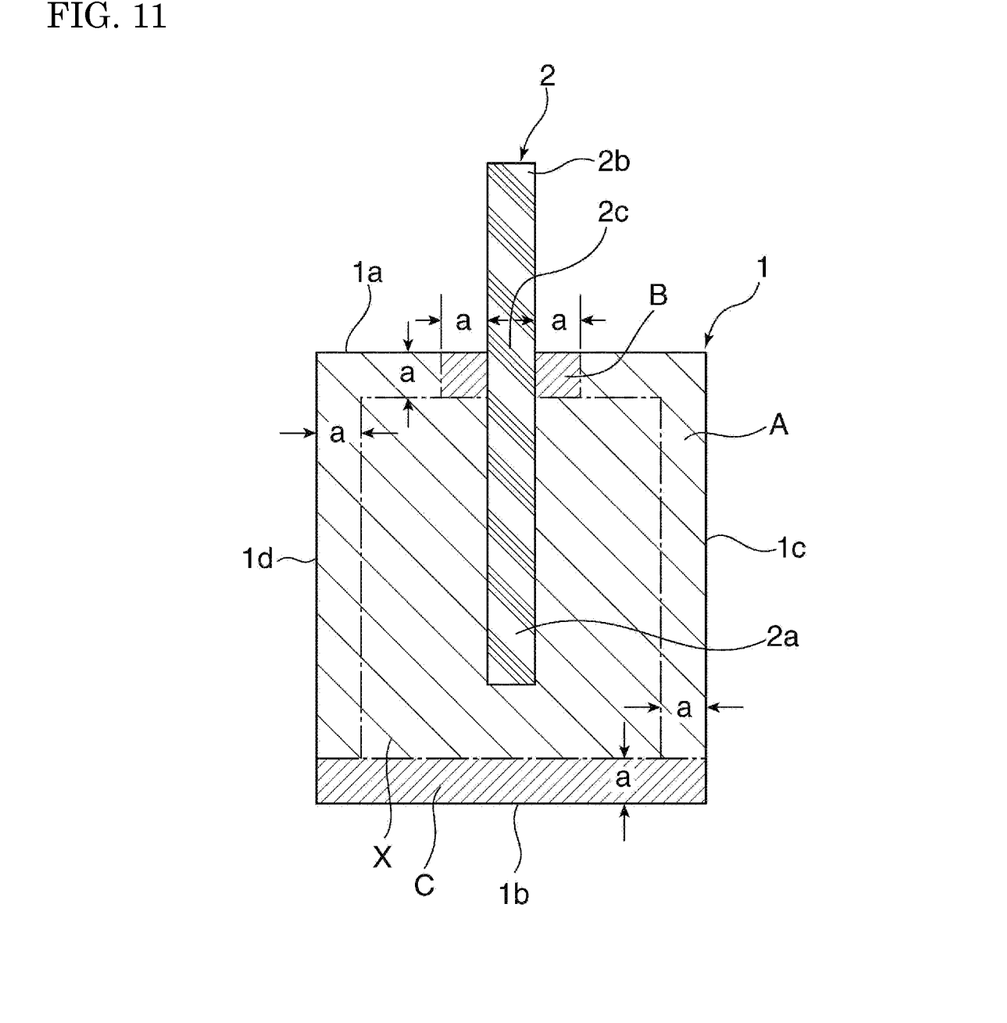
FIG. 11 is a sectional view showing a positive electrode in accordance with the first and second aspects of the exemplary embodiment.

FIG. 11 is a sectional view showing positive electrode 1 in accordance with the first and second aspects of the exemplary embodiment.

As shown in FIG. 11, in this exemplary embodiment, in both first region B and second region C, the average film thickness of dielectric layer 3 is set to be larger than the average film thickness of dielectric layer 3 in interior region X. Thus, leakage current can be further reduced, and capacitance can be further enhanced. In the first and second aspects of the exemplary embodiment, the local portion is first region B and second region C.

Film thickness d of dielectric layer 3 can be measured by a cross-sectional SEM (scanning electron microscope). In each region, film thickness d of dielectric layer 3 is measured and the measurement values are averaged, and thereby the average film thickness can be calculated. When film thickness d of dielectric layer 3 is measured, it is preferable that the measurement portions are uniformly distributed and measurement is carried out in each region to obtain the average film thickness. For example, when the average film thickness of dielectric layer 3 of the local portion and that of interior region X are compared with each other, in the cross-sectional surface obtained by cutting solid electrolytic capacitor 10, film thicknesses d are measured in five portions each of any portions in the above-mentioned local portion and interior region X, and the values are averaged to obtain the average film thickness of dielectric layer 3. Thus, the average film thickness of dielectric layer 3 in the local portion and that in interior region X can be compared with each other.

It is preferable that the average film thicknesses of dielectric layer 3 in surface region A or the local portion, first region B and second region C are about 1.1 to 3.0 times as large as the film thickness of dielectric layer 3 in interior region X.

Electrolyte layer 4 is formed on the surface of dielectric layer 3. Note here that in this exemplary embodiment, electrolyte layer 4 is formed so as to fill pores of a porous sintered body, but a portion that is not provided with electrolyte layer 4 may be included in a part. An electroconductive polymer or manganese dioxide can be used for electrolyte layer 4. The electroconductive polymer can be formed by chemical polymerization, electrolytic polymerization, or the like. Examples of material include polypyrrole, polythiophene, polyaniline, polyfuran, and the like. Electrolyte layer 4 may be formed of a single layer or a plurality of layers.

Negative electrode extracting layer 5 is formed so as to cover electrolyte layer 4, and carbon layer 5a and silver paste layer 5b are laminated sequentially so as to form a laminated structure. Carbon layer 5a is formed of a layer including carbon particles. Thus, negative electrode extracting layer 5 is formed such that it is brought into direct contact with electrolyte layer 4. In this exemplary embodiment, negative electrode extracting layer 5 is not formed on first surface 1a of the positive electrode in order to prevent short-circuit with positive electrode lead 2.

Negative electrode terminal 9 is attached to negative electrode extracting layer 5. Specifically, negative electrode terminal 9 is formed by folding a belt-like metal plate. As shown in FIG. 1, a lower surface at a first end portion 9a side is attached to negative electrode extracting layer 5 with conductive adhesive 8, so that negative electrode terminal 9 and negative electrode extracting layer 5 are connected to each other mechanically and electrically. Specific examples of conductive adhesive 8 include material such as silver paste obtained by mixing silver and epoxy resin.

Note here that negative electrode extracting layer 5 may be formed of carbon layer 5a or silver paste layer 5b, and may take various configurations as long as electrolyte layer 4 and negative electrode terminal 9 are electrically connected to each other.

Positive electrode terminal 7 is attached to second end portion 2b of positive electrode lead 2. Specifically, positive electrode terminal 7 is formed by folding a belt-like metal plate. As shown in FIG. 1, the lower surface of a first end portion 7a is connected mechanically and electrically to second end portion 2b of positive electrode lead 2 by welding.

Examples of material of positive electrode terminal 7 and negative electrode terminal 9 include copper, a copper alloy, an iron-nickel alloy (42 alloy), and the like.

Resin outer package 11 is formed so as to cover the above-mentioned positive electrode 1, negative electrode extracting layer 5, a part of positive electrode terminal 7, and a part of negative electrode terminal 9. Second end portion 7b of positive electrode terminal 7 and second end portion 9b of negative electrode terminal 9 are exposed from the side surface toward the lower surface of resin outer package 11. This exposed portion is used for solder connection with respect to a substrate. As the material of resin outer package 11, material that functions as a sealing agent is used. Specific examples include epoxy resin, silicone resin, and the like.

Resin outer package 11 can be formed by hardening resin prepared by appropriately blending a base agent, a curing agent, and filler.

(Production of Solid Electrolytic Capacitor)

Hereinafter, a method for producing a solid electrolytic capacitor in accordance with each of the above-mentioned exemplary embodiments is described.

<Process 1: Formation of Positive Electrode>

A plurality of tantalum metal particles, having a primary particle diameter of about 0.5 μm and a secondary particle diameter of about 100 μm, is molded in a state in which first end portion 2a of positive electrode lead 2 is embedded, and the molded product is sintered in a vacuum. Thereby, positive electrode 1 includes porous sintered body and positive electrode lead 2 are integrally bonded to each other. Second end portion 2b of positive electrode lead 2 is fixed in such a manner that it protrudes from first surface 1a of positive electrode 1. The outer shape of positive electrode 1 including the thus formed porous sintered body is, for example, a rectangular parallelepiped having a length of 4.2 mm, a width of 3.4 mm, and a thickness of 0.9 mm. Note here that a primary particle means the smallest particle in the tantalum metal particles and a secondary particle means the particle into which the primary particles are aggregated.

<Process 2: First Anodizing Process>

Figure 12:
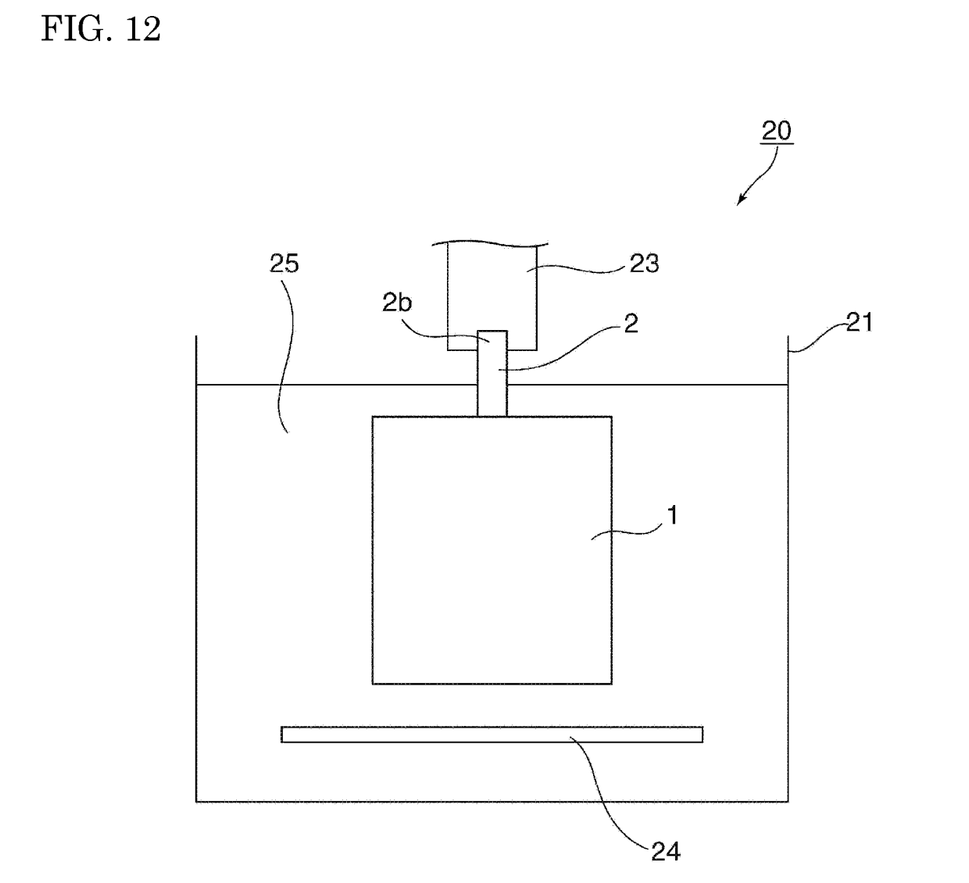
FIG. 12 is a schematic view for illustrating a first anodizing process in accordance with the exemplary embodiment.

FIG. 12 is a view for illustrating a first anodizing process. By anodizing positive electrode 1, dielectric layer 3 made of oxide coating is formed on a surface of positive electrode 1. Anodization apparatus 20 includes anodization tank 21, positive anodizing electrode 23, negative anodizing electrode 24, and electrolytic aqueous solution 25. Positive anodizing electrode 23 and negative anodizing electrode 24 are connected to a power source via wiring (not shown), respectively. Negative anodizing electrode 24 is disposed at a bottom side of anodization tank 21, and has a plate-like shape. Second end portion 2b of positive electrode lead 2 is connected to positive anodizing electrode 23, positive electrode 1 and a part of positive electrode lead 2 are immersed in anodization tank 21 filled with 0.01 to 0.1 mass % phosphoric acid solution as electrolytic aqueous solution 25, and anodization is carried out with electric current of 1 to 10 mA, at a anodizing voltage of 5 to 100 V, for 3 to 20 hours. Thus, dielectric layer 3 made of tantalum oxide ($Ta_2O_5$) can be formed on the surface of positive electrode 1 and a part of positive electrode lead 2. From this first anodizing process, dielectric layer 3 having a uniform thickness is formed on the surface of positive electrode 1 including the outer surface and wall surfaces of pores in a porous sintered body.

Note here that electrolytic aqueous solution 25 is not necessarily limited to a phosphoric acid solution, but nitric acid, acetic acid, sulfuric acid, or the like, can be used.

<Process 3: Second Anodizing Process>

Figure 13:
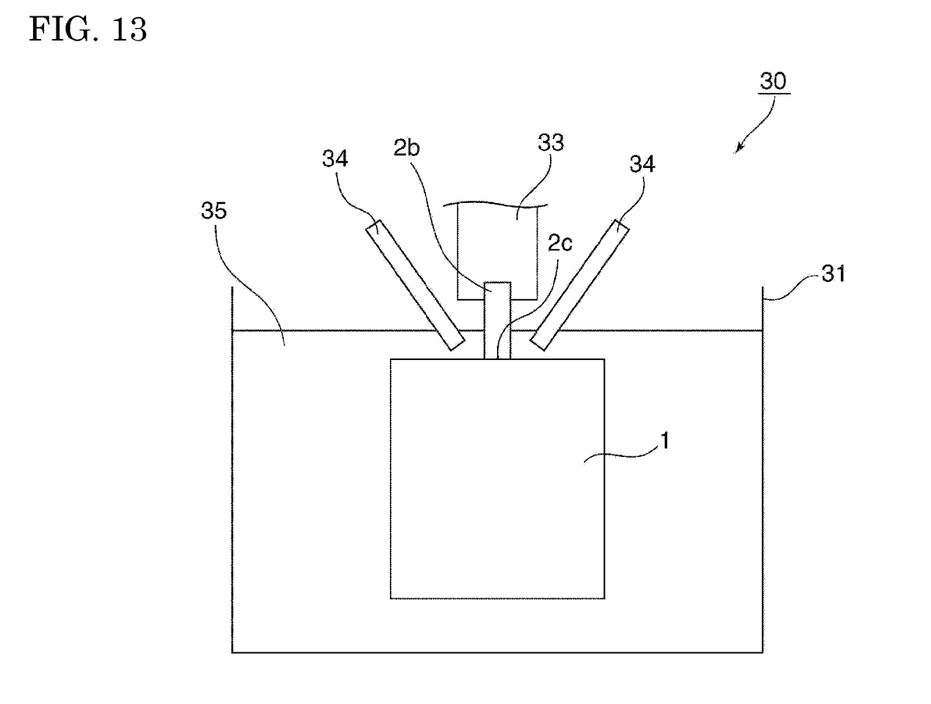
FIG. 13 is a schematic view for illustrating a second anodizing process in accordance with the exemplary embodiment.
Figure 14:
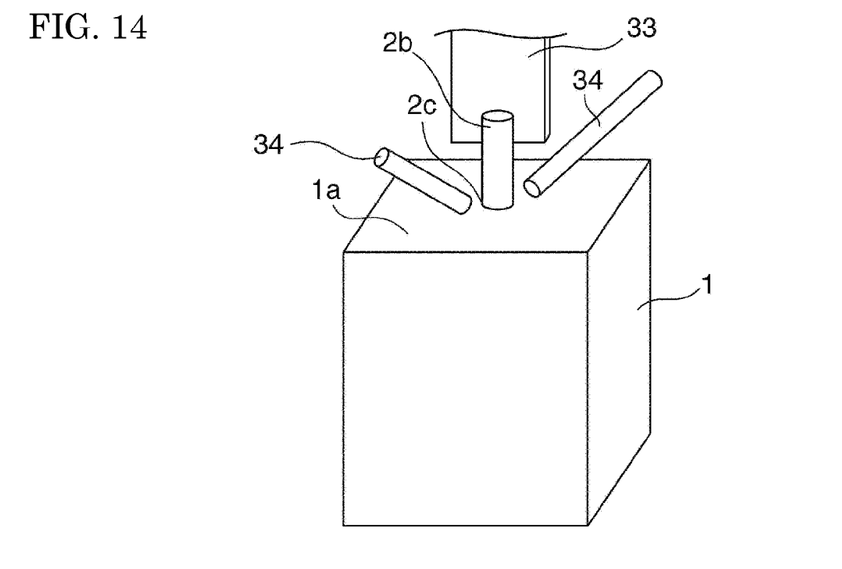
FIG. 14 is a perspective view for illustrating the second anodizing process in accordance with the exemplary embodiment.

Second anodizing process in accordance with first aspect of exemplary Embodiment Hereinafter, a second anodizing process for subjecting first region B shown in FIGS. 5 and 6 to local anodization is described. FIG. 13 is a view for illustrating a second anodizing process. As shown in FIG. 13, Anodization apparatus 30 includes anodization tank 31, positive anodizing electrode 33, negative anodizing electrode 34 (partially not shown in this drawing), and electrolytic aqueous solution 35. FIG. 14 is a schematic perspective view showing arrangement of positive anodizing electrode 33 and negative anodizing electrode 34 with respect to positive electrode 1 and positive electrode lead 2. As shown in FIG. 14, positive anodizing electrode 33 is connected to second end portion 2b of positive electrode lead 2. Negative anodizing electrode 34 is disposed such that its tip is located near root 2c of positive electrode lead 2. Positive anodizing electrode 33 and negative anodizing electrode 34 are connected to a power source via wiring (not shown), respectively.

In order to carry out local anodization, an electric current needs to be collected to a desired portion. Therefore, it is necessary to adjust the concentration (electric conductivity) of the electrolytic aqueous solution and to appropriately dispose negative anodizing electrode 34. In the second anodizing process in which local anodization is carried out, a phosphoric acid solution (electrolytic aqueous solution 35) having a lower concentration as compared with the first anodizing process is used. The local anodization of first region B can be carried out by using electrolytic aqueous solution 35 of lowered concentration and by arranging negative anodizing electrode 34 in a predetermined position against positive electrode 1.

When a distance from a tip end of negative anodizing electrode 34 to a surface of positive electrode 1 is too long, distribution of a film thickness of dielectric layer 3 is widened. When the distance is too short, positive electrode 1 may be short-circuited. Therefore, it is preferable that the distance from the tip end of negative anodizing electrode 34 to the surface of positive electrode 1 is about 0.1 to 3 mm. When the time of local anodization is too short, a sufficient film thickness of dielectric layer 3 cannot be obtained. When the time is too long, distribution of the film thicknesses of dielectric layer 3 is widened. Therefore, it is preferable that local anodization is carried out for 0.5 to 10 minutes. When a voltage for local anodization is too low, a sufficient film thickness of dielectric layer 3 cannot be obtained. When the voltage is too high, the distribution of the film thicknesses of dielectric layer 3 is widened. Therefore, it is preferable that local anodization is carried out at a voltage in a range from 50 to 200 V. Furthermore, it is preferable that the voltage of local anodization is 2 to 10 times as large as the anodization voltage of the first anodizing process.

Electrolytic aqueous solution 35 to be used for the local anodization is not necessarily limited to a phosphoric acid solution, but nitric acid, acetic acid, sulfuric acid, or the like, can be used. Since in this exemplary embodiment, in the first and second anodizing processes, the electrolytic aqueous solution using the same electrolyte is used, a washing process after the first anodizing process can be simplified.

Negative anodizing electrode 34 shown in FIGS. 13 and 14 has a thin line shape, but a needle-like electrode having a shape whose tip end portion is sharpened may be used. As the tip end portion of negative anodizing electrode 34 is more sharpened, local distribution of the film thickness of dielectric layer 3 can be obtained.

Second anodizing process in accordance with second aspect of exemplary embodiment Plate-like negative anodizing electrode 24 is disposed nearer to second surface 1b of positive electrode 1 as compared with the case in the first anodizing process and anodization is carried out while conditions of the concentration of the electrolytic aqueous solution and an anodization voltage are appropriately adjusted. Thus, second region C can be subjected to local anodization. In this process, it is preferable that a distance from negative anodizing electrode 24 to second surface 1b is about 0.1 to 3 mm.

<Process 4: Formation of Electrolyte Layer>

Electrolyte layer 4 is formed on a surface of dielectric layer 3. As a formation method in which an electroconductive polymer is used for electrolyte layer 4, for example, a pre-coat layer made of an electroconductive polymer such as polypyrrole is formed by using chemical polymerization. Subsequently, an electroconductive polymer layer of polypyrrole or the like is formed on the surface of the pre-coat layer by using electrolytic polymerization. In this way, electrolyte layer 4 of an electroconductive polymer including a laminated film of the pre-coat layer and the electroconductive polymer layer can be formed on dielectric layer 3. Electrolyte layer 4 is formed also on a surface of dielectric layer 3 formed on wall surfaces of pores of positive electrode 1.

<Process 5: Formation of Negative Electrode Extracting Layer>

Carbon layer 5a is formed by coating carbon paste such that it is brought into direct contact with a surface of electrolyte layer 4, and silver paste layer 5b is formed by coating silver paste on carbon layer 5a. In this exemplary embodiment, negative electrode extracting layer 5 includes carbon layer 5a and silver paste layer 5b. Furthermore, in this exemplary embodiment, negative electrode extracting layer 5 is formed such that the electrolyte layer is exposed near a first surface 1a of the positive electrode.

A capacitor element of this exemplary embodiment is formed by processes 1 to 5.

<Process 6: Coupling of Positive Electrode Terminal and Negative Electrode Terminal>

End portion 7a of positive electrode terminal 7 is electrically and mechanically connected to second end portion 2b of positive electrode lead 2 by welding. Furthermore, end portion 9a of negative electrode terminal 9 is electrically and mechanically connected onto negative electrode extracting layer 5 with conductive adhesive 8.

Note here that in this exemplary embodiment, positive electrode terminal 7 and positive electrode lead 2 are connected to each other before dielectric layer 3 is formed. Positive electrode terminal 7 functions as positive anodizing electrodes 23 and 33 of the above-mentioned processes 2 and 3. Furthermore, electrolyte layer 4 and negative electrode extracting layer 5 are formed in a state in which positive electrode terminal 7 and positive electrode lead 2 are connected to each other.

<Process 7: Mold Process>

After formation of process 6 is carried out, resin outer package 11 is formed by a transfer molding method such that a part of a positive electrode terminal 7 and a part of a negative electrode terminal 9 are exposed by using a sealing agent including epoxy resin and an imidazole compound. Specifically, a sealing agent which has been preheated is infused into a mold, and hardened in the mold. After resin outer package 11 is formed, the exposed positive electrode terminal 7 and the negative electrode terminal 9 are bent from the side surface to the lower surface side of resin outer package 11, terminals 7b and 9b portions used for solder connections to the substrate are formed.

Note here that in case of producing a plurality of solid electrolytic capacitors, a plurality of positive electrode terminals 7 are formed in a belt-like lead frame, a plurality of positive electrode leads 2 of positive electrodes 1 are connected to the plurality of positive electrode terminals 7, respectively. Similarly, a plurality of negative electrode terminal 9 are also formed in a belt-like lead frame, and a plurality of negative electrode extracting layer 5 of capacitor elements are connected to the plurality of negative electrode terminal 9, respectively. Thus, resin outer package 11 of process 7 is formed in a state in which a plurality of capacitor elements is fixed to a lead frame. Next, unnecessary portions of the lead frame are cut, and positive electrode terminal 7 and negative electrode terminal 9 are bent as in process 7, and a plurality of solid electrolytic capacitors are produced.

EXAMPLES

Hereinafter, the present disclosure is described with reference to specific Examples, but the present disclosure is not necessarily limited to the following Examples.

Porous sintered bodies are produced by using tantalum metal particles having CV values of 50000, 70000, 100000, 150000, 200000, and 250000 µF·V/g, respectively. Solid electrolytic capacitors of Examples 1 to 7 are produced by using the porous sintered bodies as positive electrodes 1 according to the above-mentioned processes 1 to 7. Note here that anodization is carried out with an electric current of 1 mA and at anodization voltages shown in Table 1 (the anodization voltage) for two hours by using 1 mass % phosphoric acid solution as an electrolytic aqueous solution in the first anodizing process.

Then, anodization is carried out with an electric current of 20 mA and at an anodization voltage of 200 V for 10 minutes by using 1 mass % phosphoric acid solution as an electrolytic aqueous solution in the second anodizing process. Note here that the second anodization is carried out in region C in Examples 1 to 6 and in region B in Example 7 according to methods by the above-mentioned exemplary embodiment.

Porous sintered bodies are produced by using tantalum metal particles having CV values of 50000, 70000, 100000, 150000, 200000, and 250000 µF·V/g. Solid electrolytic capacitors of Reference Examples 1 to 6 are produced by using the porous sintered bodies as positive electrodes 1 according to the above-mentioned processes 1, 2, 4 to 7. Note here that anodization is carried out with an electric current of 1 mA and at anodization voltages shown in Table 1 (the anodization voltage) for two hours by using 1 mass % phosphoric acid solution as an electrolytic aqueous solution in the first anodizing process.

[Evaluation of Solid Electrolytic Capacitor]

Solid electrolytic capacitors obtained in Examples 1 to 7 and Reference Examples 1 to 6 are measured for the capacitance and the leakage current. The capacitance is measured by using an LCR meter in the frequency of 120 kHz at 0.1 V. And the leakage current is evaluated by measuring an electric current value 5 minutes after 1.0 V of direct current voltage has been applied.

Measurement results are shown in Table 1. Values of the leakage current and capacitance in Examples and Reference Examples are relative values against the values of the leakage current and the capacitance in Reference Example 3 which are set as 100, respectively.

TABLE 1

| | CV value [µF · V/g] | Anodization voltage [V] | Local anodization region (second anodization) | Local anodization voltage [V] | Leakage current [a.u.] | Capacitance [a.u] |
|---|---|---|---|---|---|---|
| Ex. 1 | 50000 | 31.5 | 2nd region C | 200 | 31 | 48 |
| Ex. 2 | 70000 | 31.5 | 2nd region C | 200 | 40 | 64 |
| Ex. 3 | 100000 | 12 | 2nd region C | 200 | 55 | 105 |
| Ex. 4 | 150000 | 12 | 2nd region C | 200 | 69 | 155 |
| Ex. 5 | 200000 | 12 | 1st region B | 200 | 165 | 177 |
| Ex. 6 | 250000 | 12 | 2nd region C | 200 | 261 | 201 |
| Ex. 7 | 250000 | 12 | 1st region B | 200 | 279 | 193 |
| Re. Ex. 1 | 50000 | 31.5 | — | — | 49 | 52 |
| Re. Ex. 2 | 70000 | 31.5 | — | — | 72 | 69 |
| Re. Ex. 3 | 100000 | 12 | — | — | 100 | 100 |
| Re. Ex. 4 | 150000 | 12 | — | — | 149 | 147 |
| Re. Ex. 5 | 200000 | 12 | — | — | 253 | 165 |
| Re. Ex. 6 | 250000 | 12 | — | — | 361 | 188 |

Ex. = Example
Re. Ex = Reference Example
1st region B = first region B
2nd region C = second region C Furthermore, A capacitance change rate is calculated from dividing the capacitance value of Example by the capacitance value of Reference Example for the same CV value with the Example. The capacitance change rates are shown in Table 2.

TABLE 2

| | CV value [µF · V/g] | Capacitance change rate |
|---|---|---|
| Ex. 1/Re. Ex. 1 | 50000 | 0.923 |
| Ex. 2/Re. Ex. 2 | 70000 | 0.928 |
| Ex. 3/Re. Ex. 3 | 100000 | 1.050 |
| Ex. 4/Re. Ex. 4 | 150000 | 1.054 |
| Ex. 5/Re. Ex. 5 | 200000 | 1.073 |
| Ex. 6/Re. Ex. 6 | 250000 | 1.069 |
| Ex. 7/Re. Ex. 6 | 250000 | 1.027 |

Ex. = Example
Re. Ex = Reference Example

Figure 15:
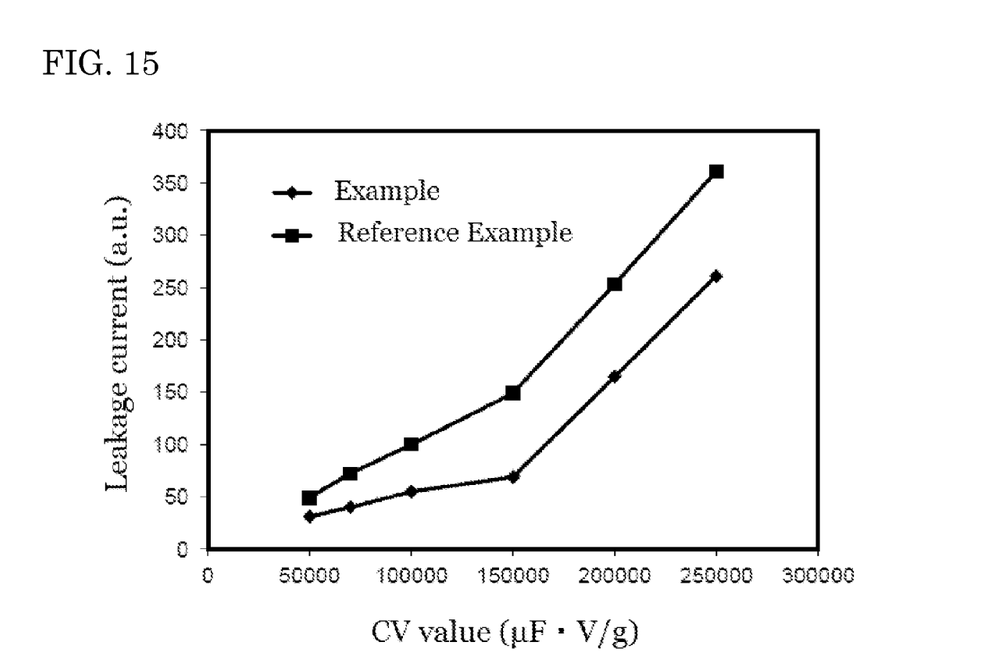
FIG. 15 is a graph showing relation between a CV value of metal particles constituting the positive electrode and leakage current.
Figure 16:
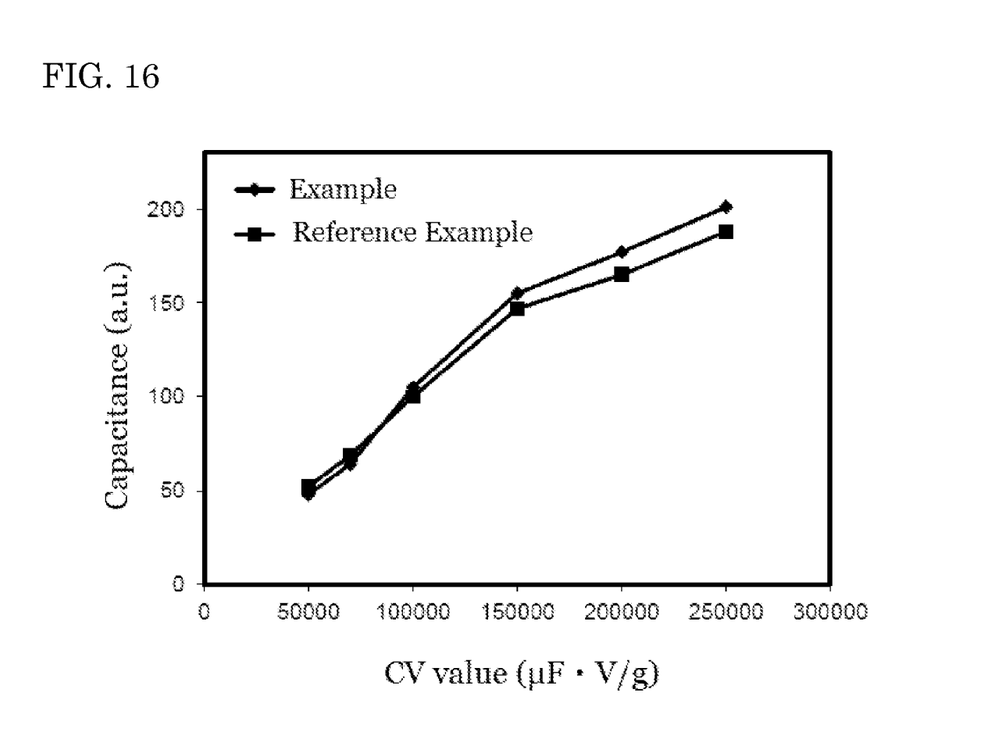
FIG. 16 is a graph showing relation between the CV value of metal particles constituting the positive electrode and capacitance.
Figure 17:
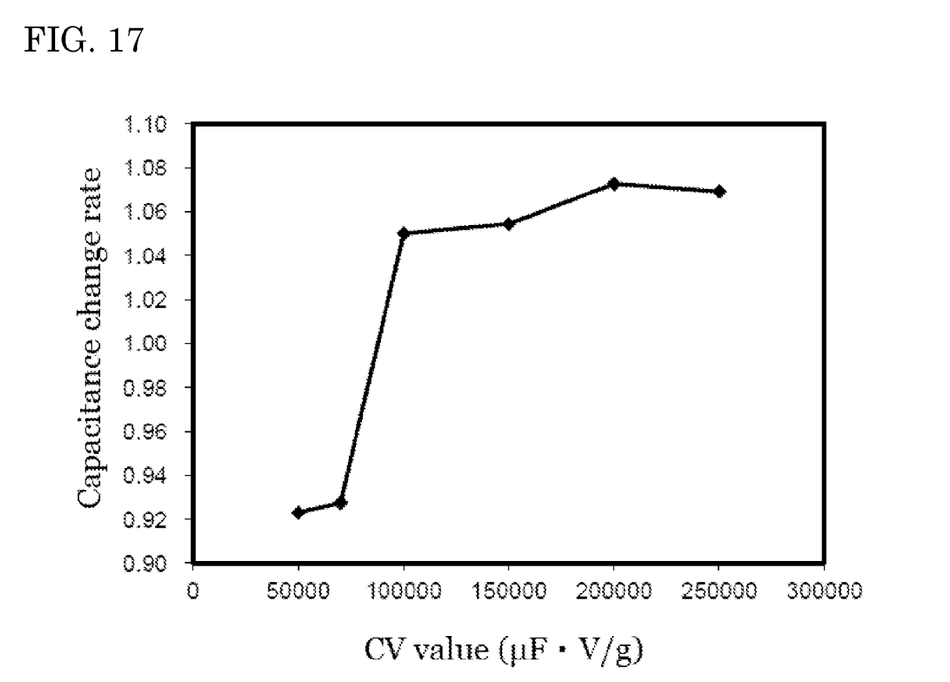
FIG. 17 is a graph showing relation between the CV value of metal particles constituting the positive electrode and a change rate of capacitance.

FIG. 15 is a graph showing relation between CV values and leakage currents in accordance with Examples and Reference Examples. FIG. 16 is a graph showing relation between the CV values and capacitances. FIG. 17 is a graph showing relation between the CV values and capacitance change rates.

As shown in FIG. 15, leakage currents of Examples 1 to 6 are smaller than leakage currents of Reference Examples for the same CV value, respectively.

As shown in FIGS. 16 to 17, and Table 2, when the CV value is 50000 and 70000 µF·V/g, the capacitances of Examples (Examples 1 and 2) are smaller than those of Reference Examples for the same CV value (Reference Examples 1 and 2). On the contrary, when the CV value is 100000 µF·V/g or more, the capacitance of Examples (Examples 3, 4, 5, and 6) are larger than those of Reference Examples for the same CV value (Reference Examples 3, 4, 5, and 6).

Furthermore, as shown in Table 2, as for Example 7 in which local anodization is carried out in first region B, the capacitance of Example (Examples 7) is larger than that of Reference Example for the same CV value (Reference Examples 7).

As shown in Table 2 and FIG. 17, when the CV value is 50000 and 70000 µF·V/g, capacitance change rates shows under 1.0. That means the capacitances are deteriorated in Examples.

On the contrary, when metal particles having the CV value of 100000 µF·V/g are used, capacitance change rates shows over 1.0. That means the capacitances are enhanced in Examples. And the leakage currents can also be reduced in those Examples.

From the above-mentioned results, according to the present disclosure, it is shown that the leakage current can be reduced and the capacitance can be enhanced.

What is claimed is:

1. A solid electrolytic capacitor comprising:
   a positive electrode configured by a sintered body of metal particles of tantalum or an alloy of tantalum, an outer surface of the positive electrode having a first surface and a second surface, and the second surface being located opposite to the first surface;
   a positive electrode lead having a first end portion embedded in the first surface of the positive electrode, and a second end portion protruding from the first surface,
   a dielectric layer formed on a surface of the positive electrode; and
   an electrolyte layer formed on the dielectric layer, wherein:
   a CV value, which is a value of product of capacitance and voltage, of the metal particles is 100000 µF·V/g or more,
   the positive electrode includes a surface region and an interior region,
   the surface region is configured by the outer surface of the positive electrode and a vicinity of the outer surface, and the interior region is an inner part of the positive electrode surrounded by the surface region,
   an average film thickness of the dielectric layer in the surface region is greater than an average film thickness of the dielectric layer in the interior region,
   the surface region includes a first region in a vicinity of a root of the positive electrode lead, and
   an average film thickness of the dielectric layer in the first region is greater than an average film thickness of the dielectric layer in the surface region other than the first region.

2. A method for producing a solid electrolytic capacitor comprising a positive electrode configured by a sintered body of metal particles of tantalum or an alloy of tantalum, an outer surface of the positive electrode having a first surface and a second surface, and the second surface being located opposite to the first surface, a dielectric layer formed on a surface of the positive electrode, and an electrolyte layer formed on the dielectric layer, wherein the positive electrode includes a surface region and an interior region, the surface region is configured by the outer surface of the positive electrode and a vicinity of the outer surface, and the interior region is an inner part of the positive electrode surrounded by the surface region,
   the method comprising:
   embedding a positive electrode lead into the positive electrode such that a first end portion of the positive electrode lead is embedded in the first surface of the positive electrode and a second end portion of the positive electrode lead protrudes from the first surface, and
   forming the dielectric layer on a surface of the positive electrode in a vicinity of a root of the positive electrode lead by anodizing, a tip end of a negative anodizing electrode for the anodizing being disposed near the vicinity of the root of the positive electrode lead.

3. A solid electrolytic capacitor comprising:
   a positive electrode configured by a sintered body of metal particles of tantalum or an alloy of tantalum, the outer surface of the positive electrode having a first surface and a second surface, and the second surface being located opposite to the first surface;
   a positive electrode lead having a first end portion embedded in the first surface of the positive electrode, and a second end portion protruding from the first surface,
   a dielectric layer formed on a surface of the positive electrode; and
   an electrolyte layer formed on the dielectric layer, wherein:
   a CV value, which is a value of product of capacitance and voltage, of the metal particles is 100000 µF·V/g or more,
   the positive electrode includes a surface region and an interior region,
   the surface region is configured by an outer surface of the positive electrode and a vicinity of the outer surface, and the interior region is an inner part of the positive electrode surrounded by the surface region,
   an average film thickness of the dielectric layer in the surface region is greater than an average film thickness of the dielectric layer in the interior region,
   the surface region includes a second region including the second surface and a vicinity of the second surface, and
   an average film thickness of the dielectric layer in the second region is greater than an average film thickness of the dielectric layer in the surface region other than the second region.

4. The method for producing a solid electrolytic capacitor according to claim 2, wherein a distance from the tip end of negative anodizing electrode to the outer surface of the positive electrode is substantially from 0.1 mm to 3 mm, inclusive.

* * * * *